US008803430B2

(12) United States Patent
Ye et al.

(10) Patent No.: US 8,803,430 B2
(45) Date of Patent: Aug. 12, 2014

(54) LIGHT SOURCE MODULE, METHOD OF DRIVING THE LIGHT SOURCE MODULE AND DISPLAY APPARATUS HAVING THE LIGHT SOURCE MODULE

(75) Inventors: Byoung-Dae Ye, Yongin-si (KR); Yong-Hoon Kwon, Asan-si (KR); Hyung-Jin Kim, Seoul (KR)

(73) Assignee: Samsung Display Co., Ltd. (KR)

( * ) Notice: Subject to any disclaimer, the term of this patent is extended or adjusted under 35 U.S.C. 154(b) by 223 days.

(21) Appl. No.: 13/410,007

(22) Filed: Mar. 1, 2012

(65) Prior Publication Data
US 2012/0319601 A1 Dec. 20, 2012

(30) Foreign Application Priority Data

Jun. 16, 2011 (KR) .......................... 10-2011-0058563

(51) Int. Cl.
*H05B 37/02* (2006.01)
(52) U.S. Cl.
USPC ........ 315/192; 315/185 R; 315/193; 315/291; 315/294; 315/308
(58) Field of Classification Search
USPC ............. 315/185 R, 192, 193, 246, 250, 291, 315/294, 297, 307, 308
See application file for complete search history.

(56) References Cited

U.S. PATENT DOCUMENTS

| 5,467,049 A * | 11/1995 | Kida et al. ..................... 327/438 |
| 6,853,150 B2 | 2/2005 | Clauberg et al. |
| 2010/0102336 A1* | 4/2010 | Lee et al. ......................... 257/88 |
| 2011/0109239 A1* | 5/2011 | Kojima .......................... 315/250 |
| 2011/0210678 A1* | 9/2011 | Grajcar .......................... 315/192 |
| 2011/0255303 A1* | 10/2011 | Nichol et al. ................. 362/606 |

FOREIGN PATENT DOCUMENTS

| JP | 2006-179672 A | 7/2006 |
| KR | 1020070093761 A | 9/2007 |

* cited by examiner

*Primary Examiner* — Douglas W Owens
*Assistant Examiner* — Thai Pham
(74) *Attorney, Agent, or Firm* — Innovation Counsel LLP

(57) ABSTRACT

A light source module includes a LED array, a switch and a control part. The LED array includes a plurality of LED rows and a bridge light emitting part connecting the LED rows with each other. Each of the LED rows has a first direction light emitting part and a second direction light emitting part which are alternately disposed with each other. The switch adjusts an intensity of a current applied to the LED array. The control part determines an output status of the LED array and provides a control signal to the switch.

19 Claims, 8 Drawing Sheets

LIGHT SOURCE MODULE, METHOD OF DRIVING THE LIGHT SOURCE MODULE AND DISPLAY APPARATUS HAVING THE LIGHT SOURCE MODULE

This application claims priority to Korean Patent Application No. 2011-0058563, filed on Jun. 16, 2011, and all the benefits accruing therefrom under 35 U.S.C. §119, the contents of which in its entirety is herein incorporated by reference.

BACKGROUND OF THE INVENTION

1. Field of the Invention

Exemplary embodiments of the present invention relate to a light source module, a method of driving the light source module and a display apparatus having the light source module. More particularly, exemplary embodiments of the present invention relate to a light source module driven stably, a method of driving the light source module and a display apparatus having the light source module.

2. Description of the Related Art

Generally, a liquid crystal display panel includes a display substrate, an upper substrate facing the display substrate and a liquid crystal layer disposed between the display substrate and the upper substrate. The display panel includes a display region where a plurality of lines and a plurality of transistors connected to the lines are formed and a peripheral region where a pad applying an electric signal to the lines is formed.

Because a liquid crystal display apparatus is a non-emissive display apparatus which does not emit light by itself, the liquid crystal display apparatus includes a light source module disposed under the liquid crystal display panel. The light source module provides light having a uniform luminance to the entire liquid crystal display panel.

Light emitting diodes ("LED") have been widely employed as a light source in the light source module. Generally, the current applied to the liquid crystal display apparatus from an outside source is alternating current ("AC"), and therefore the light source module converts the AC current to a direct-current ("DC") current needed in the light source module. The luminance level of the LEDs in the light source module is modulated according to the intensity of the current passing through the LED. Thus, the luminance level of an LED may be adjusted using a passive element, such as a resistor, connected to the LED.

Conventionally, the AC current has been converted to the DC current for driving the LEDs using a converting apparatus, or the AC current has been rectified using a bridge diode circuit. In addition, a resistor has been connected at an end portion of the LED to prevent flow of an overcurrent through the light source module without adjusting the intensity of the DC current.

BRIEF SUMMARY OF THE INVENTION

A light source module capable of driving a light emitting diode ("LED") array with an AC current, detecting a current flowing through the LED, and adjusting an intensity of the current is provided.

A method of driving the light source module is also provided.

A display apparatus including the light source module is also provided.

The light source module includes an LED array, a switch and a control part. The LED array includes a plurality of LED rows and a bridge light emitting part connecting the LED rows with each other. Each of the LED rows has a first direction light emitting part and a second direction light emitting part which are alternately disposed with each other. The switch adjusts an intensity of a current applied to the LED array. The control part determines an output status of the LED array and provides a control signal to the switch.

An alternating-current ("AC") current may be applied to the LED array.

An output terminal and a control terminal of the switch may be connected to the control part. An input terminal of switch may be connected to an output terminal of the LED array.

The switch may include a thin film transistor.

The control part may maintain a level of the control signal when the output of the LED array is in a predetermined range. The control part may adjust the level of the control signal when the output of the LED array is out of the predetermined range.

The light source module may further include a resistor connected to the LED array in series.

The light source module may include m LED arrays, where m may be a natural number equal to or greater than 2.

The LED arrays may be connected with each other in parallel.

The light source module may further include m control parts and m switches which are respectively connected to the m LED arrays. The LED arrays may be independently driven.

The light source module may further include a light guide plate. The LED arrays may be disposed along at least one side of the light guide plate.

A method of driving a light source includes driving an LED array, adjusting an intensity of a current applied to the LED array and determining an output status of the LED array and outputting a control signal to the switch to control the output of the LED array. The LED array includes a plurality of LED rows and a bridge light emitting part connecting the LED rows with each other. Each of the LED rows has a first direction light emitting part and a second direction light emitting part which are alternately disposed with each other.

The LED array may receive an AC current.

Outputting the control signal may include maintaining a level of the control signal when the output status of the LED array is in a predetermined range, and adjusting the level of the control signal when the output status of the LED array is out of the predetermined range.

In one aspect, a display apparatus is provided. The display apparatus includes a display panel and a light source module. The display panel includes a plurality of pixels. The light source module includes an LED array, a switch and a control part. The LED array includes a plurality of LED rows and a bridge light emitting part connecting the LED rows with each other. Each of the LED rows has a first direction light emitting part and a second direction light emitting part which are alternately disposed with each other. The switch adjusts an intensity of a current applied to the LED array. The control part determines an output status of the LED array and provides a control signal to the switch.

The control part may maintain a level of the control signal when the output status of the LED array is in a predetermined range. The control part may adjust the level of the control signal when the output status of the LED array is out of the predetermined range.

The light source module may include m LED arrays connected with each other in parallel, where m may be a natural number equal to or greater than 2.

The light source module may further include m control parts and m switches which are respectively connected to the m LED arrays. The LED arrays may be independently driven.

The display apparatus may further include a light guide plate disposed under the display panel and facing a rear surface of the display panel.

The LED arrays may be disposed along at least one side of the light guide plate.

The LED arrays may be disposed under the display panel and facing a rear surface of the display panel.

According to the method of driving the light source, the light source module for performing the method and the display apparatus having the light source module, the driving voltage generating part generates a second DC voltage which is a difference between a driving voltage and a first DC voltage, so that an energy efficiency may be improved. Thus, a driving efficiency of the light source module may be improved so that a power consumption of the light source module may be decreased.

BRIEF DESCRIPTION OF THE DRAWINGS

The above and other features and advantages will become more apparent by description of the exemplary embodiments thereof with reference to the accompanying drawings, in which.

DETAILED DESCRIPTION OF THE INVENTION

Hereinafter, exemplary embodiments will be described in further detail with reference to the accompanying drawings.

Figure 1:
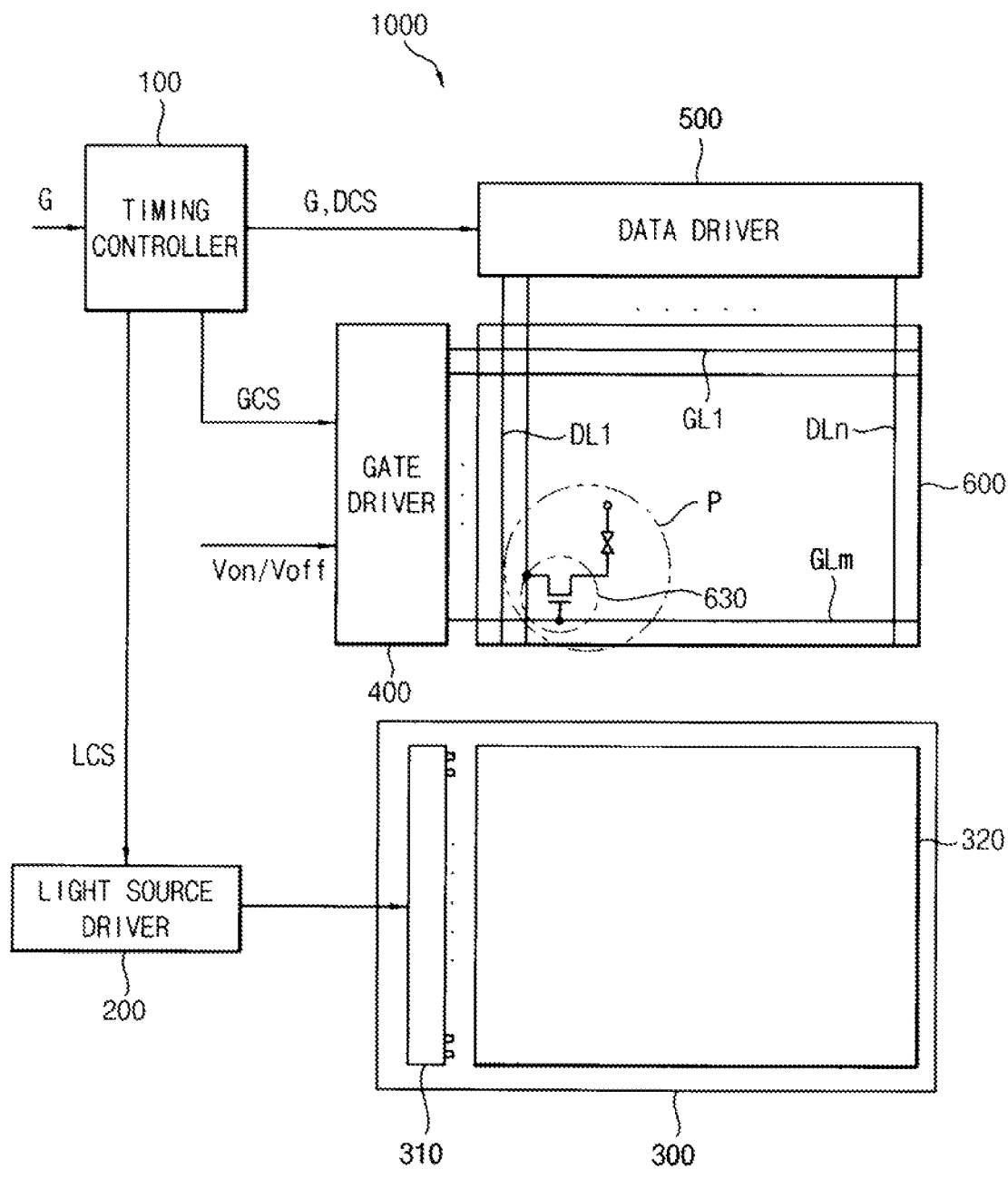
FIG. 1 is a block diagram illustrating a display apparatus according to an exemplary embodiment.

FIG. 1 is a block diagram illustrating a display apparatus 1000 according to an exemplary embodiment.

Referring to FIG. 1, the display apparatus 1000 includes a timing controller 100, a light source driver 200, a light source module 300, a gate driver 400, a data driver 500 and a display panel 600.

The timing controller 100 receives an image data G from outside the timing controller. Based on the image data G, the timing controller determines a dimming level of a light emitting module 310 in the light source module 300 and generates a light source control signal LCS. The timing controller then provides the light source control signal LCS to the light source driver 200.

The timing controller 100 also transmits the image data G to the data driver 500, and generates a data control signal DCS. The timing controller 100 provides the data control signal DCS to the data driver 500. The timing controller 100 also generates a gate control signal GCS for controlling the display panel 600. The timing controller 100 provides the gate control signal GCS to the gate driver 400.

The light source driver 200 drives the light source module 300 using the light source control signal LCS provided from the timing controller 100. The light source control signal LCS includes a dimming level for the light emitting module 310. The light source driver 200 controls the dimming duty of the light emitting module 310 based on the dimming level of the light emitting module 310 included in the light source control signal LCS.

The light source module 300 provides light to the display panel 600. The light source module 300 includes the light emitting module 310 and a light guide plate 320. As shown in FIG. 1, the light emitting module 310 may be disposed along at least one shorter side of the light guide plate 320. Alternatively, the light emitting module 310 may be disposed along at least one longer side of the light guide plate 320.

As will be described below in more detail with reference to FIG. 2, the light emitting module 310 includes a plurality of light emitting diodes ("LED"s), a control part and a plurality of switches. The LEDs are disposed in an LED array with a ladder structure (described in more detail below). A current may flow through the LED array in both directions. Switches are connected to both end portions of the LED array. A control terminal and an output terminal of each switch are connected to the control part.

When AC current is applied to the light emitting module 310, the LEDs alternately emit light according to the direction of the AC current. The current applied to the LED is fed back to the control part through an output terminal of the switch. The control part detects the current applied to the LED. When the current applied to the LED is out of a predetermined range, the control part adjusts a voltage applied to the switch so that the current applied to the LED may be adjusted. Thus, the current flowing through the LEDs may be uniformly maintained within the predetermined range.

The light guide plate 320 guides the light emitted from the light emitting module 310 to the display panel 600.

The gate driver 400 generates a plurality of gate signals using the gate control signal GCS provided from the timing controller 100 and gate on/off voltages Von and Voff provided from a voltage generator (not shown). The gate driver 400 sequentially applies the gate signals to the display panel 600. The gate driver 400 may include a plurality of gate drive ICs (not shown). The gate drive ICs may include a plurality of switching elements directly formed on the peripheral region of the display panel 600 in the same process that the switching elements of the pixels P are formed.

The data driver 500 receives the image data G and the data control signal DCS from the timing controller 100 and a plurality of grayscale voltages from a grayscale voltage generator (not shown). The data driver 500 uses grayscale voltages to convert the image data G into analog type data voltages. The data driver 500 applies the data voltage to the display panel 600. The data driver 500 may include a plurality of data drive ICs.

The display panel 600 displays an image. The display panel 600 includes a plurality of gate lines GL1 to GLm, a plurality of data lines DL1 to DLn and a plurality of pixels P. The gate lines GL1 to GLm extend in a first direction D1. The data lines DL1 to DLn extend in a second direction D2 crossing the first direction D1. The gate lines GL1 to GLm are connected to the gate driver 400. The data lines DL1 to DLn are connected to the data driver 500. Each pixel P includes a switching element 630 connected to the gate line and the data line and a pixel electrode (not shown) electrically connected to the switching element 630.

Figure 2:
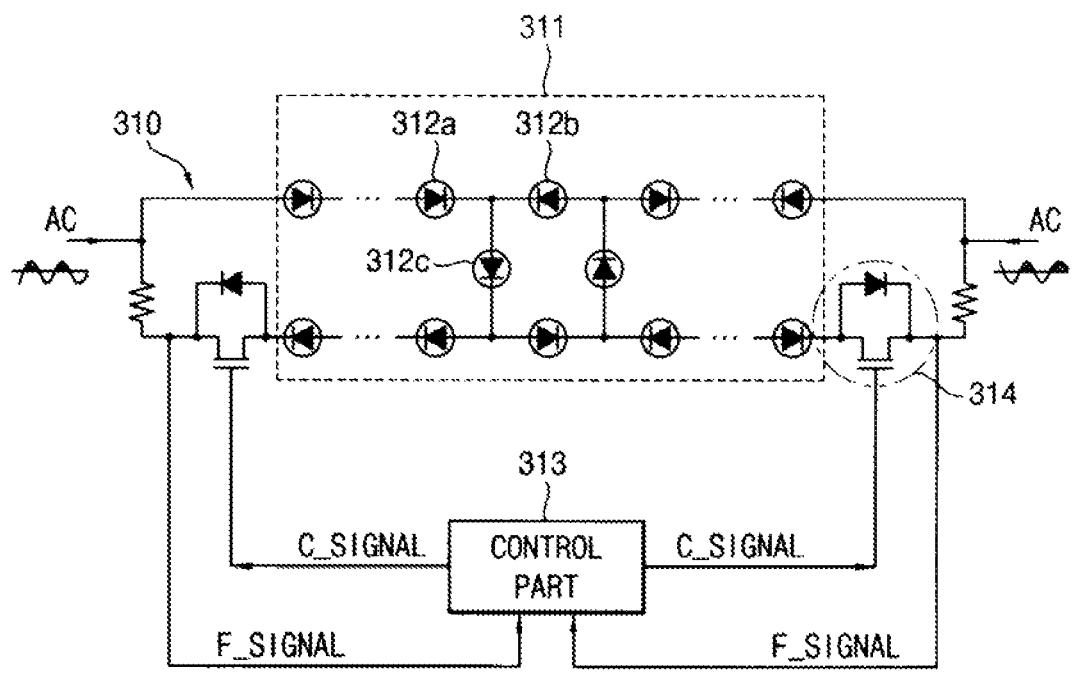
FIG. 2 is a circuit diagram illustrating a light emitting module of FIG. 1.

FIG. 2 is a circuit diagram illustrating the light emitting module 310 of FIG. 1.

Referring to FIG. 2, the light emitting module 310 includes the LED array 311, the control part 313 and the switches 314. The light emitting module 310 is driven by the AC current received from outside the apparatus.

The LED array 311 includes first direction light emitting parts 312a, second direction light emitting parts 312b and bridge light emitting parts 312c. The light emitting parts 312 are disposed in a ladder shape through which current can flow in both directions, so that the light emitting parts 312 form the LED array 311.

The LED array 311 is divided into two parts according to the direction of the AC current applied to the LED array 311. The light emitting parts 312 may be disposed in two rows, and additional light emitting parts 312 connect the two rows of the light emitting parts 312.

For example, the first direction light emitting part 312a and the second direction light emitting part 312b are alternately disposed along both of the two rows of the light emitting parts. The bridge light emitting part 312c connects two rows of the light emitting parts. Anode electrodes (+) of the first direction light emitting part 312a and the second direction light emitting part 312b are connected to a cathode electrode (−) of the bridge light emitting part 312c. Cathode electrodes (−) of the first direction light emitting part 312a and the second direction light emitting part 312b are connected to an anode electrode (+) of the bridge light emitting part 312c. Thus, the bridge light emitting parts 312c are disposed on the bridge (i.e., the "rungs") parts of the ladder structure in alternating directions.

Thus, when the current having a forward direction flows through the first direction light emitting part 312a, the first direction light emitting part 312a and a first portion of the bridge light emitting part 313c emit lights. In contrast, when the current having a forward direction flows through the second direction light emitting part 312b, the second direction light emitting part 312b and the other portion of bridge light emitting part 313c having the opposite direction emit lights. The first direction light emitting part 312a and the second direction light emitting part 312b alternately emit lights.

Therefore, as AC current is applied to both ends of the light emitting module 310, the light emitting module 310 essentially rectifies the AC current to drive the LED array 311 without an AC-DC converter.

An input terminal of the switch 314 is connected to an output terminal of the LED array 311. The switch 314 may include a diode and a transistor connected to the diode in parallel. For example, the switch 314 may include a thin film transistor. The control terminal and the output terminal of the switch 314 are connected to the control part 313.

The control part 313 receives a feedback signal F_SIGNAL from the output terminal of the switch 314. The control part 313 determines whether the feedback signal F_SIGNAL is greater than an upper limit value F+α or smaller than a lower limit value F−α. According to the determination, the control part 313 adjusts a level of a control signal C_SIGNAL applied to the control terminal of the switch 314 to adjust the intensity of the current flowing through the light emitting module 310. The feedback signal F_SIGNAL may be substantially the same as an output current of the LED array 311.

Figure 3:
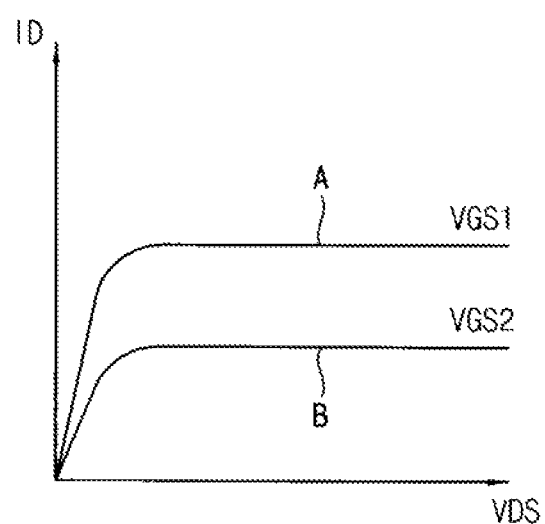
FIG. 3 is a graph illustrating a current-voltage characteristic of a switch of FIG. 2.

FIG. 3 is a graph illustrating a current-voltage characteristic of the switch 314 of FIG. 2 when the switch 314 includes an N-type transistor. Referring to FIG. 3, a voltage VGS1 between the control terminal and the input terminal shown in first curve A is greater than a voltage VGS2 between the control terminal and the input terminal shown in second curve B. Hereinafter, the switch 314 is assumed to include the N-type transistor. Alternatively, the switch 314 may include a P-type transistor or another switching element.

Until a voltage VDS between the input terminal and the output terminal increases to a threshold voltage, a current ID flowing through the switch 314 increases. When the voltage VDS between the input terminal and the output terminal is over the threshold voltage, the current ID flowing through the switch 314 is saturated. In addition, when the voltage VDS between the input terminal and the output terminal is fixed, the current ID increases as the voltage VGS between control terminal and the input terminal increases.

When the feedback signal F_SIGNAL is greater than the upper limit value F+α, the control part 313 decreases a level of the control signal C_SIGNAL that is applied to the control terminal of the switch 314, so that the voltage VGS between the input terminal and the control terminal may be decreased. Thus, the current flowing through the light emitting module 310 may be decreased. When the feedback signal F_SIGNAL is smaller than the lower limit value F−α, the control part 313 increases a level of the control signal C_SIGNAL that is applied to the control terminal of the switch 314, so that the voltage VGS between the input terminal and the control terminal may be increased. Thus, the current flowing through the light emitting module 310 may be increased. When the feedback signal F_SIGNAL is smaller than or equal to the upper limit value F+α and the feedback signal F_SIGNAL is greater than or equal to the lower limit value F−α, a level of the control signal C_SIGNAL that is applied to the control terminal of the switch 314 is maintained.

Thus, the LED array 311 is driven by a current having a substantially uniform level.

According to the present exemplary embodiment, the light emitting parts are disposed in an array having a ladder-like shape through which current can flow in both directions, so that the AC current may be essentially rectified to drive the light emitting parts without an AC-DC converter. The switch connected to the control part is connected to the output terminal of the LED array so that the intensity of the current flowing through the light emitting parts may be adjusted by the switch. The control part and the switch may include one or more active elements such as a transistor and a diode.

Thus, the display apparatus does not include a converter, so that a manufacturing cost may be decreased. In addition, the light emitting module includes the control part and the switch so that the intensity of the current flowing through the light emitting parts may be adjusted. Accordingly, the light emitting parts may be driven stably, and may have long endurance.

Figure 4:
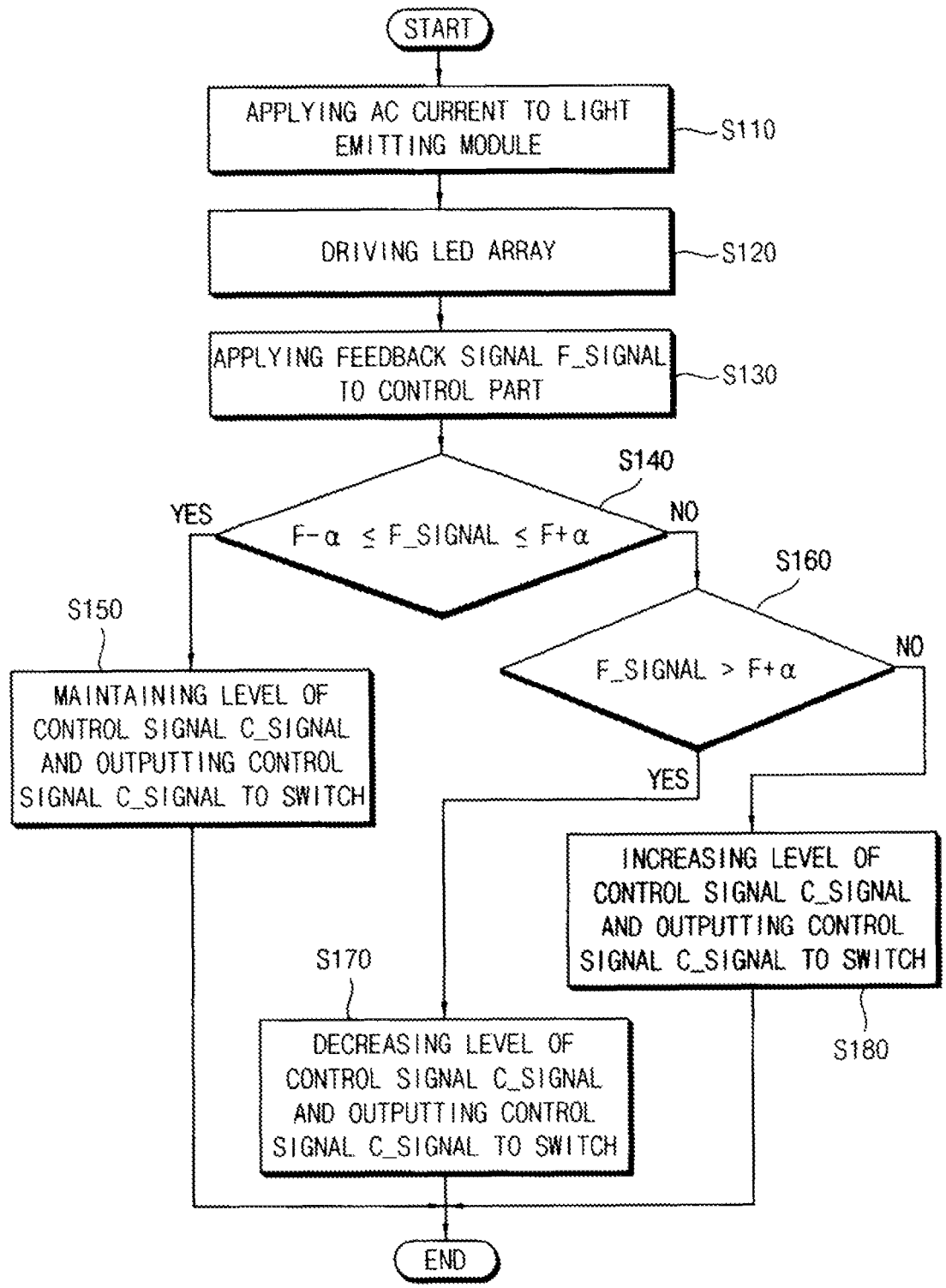
FIG. 4 is a flow chart illustrating a method of driving the light emitting module of FIG. 1.

FIG. 4 is a flow chart illustrating a method of driving the light emitting module 310 of FIG. 1.

The AC current is applied to both end portions of the light emitting module 310 (step S110).

According to the AC current applied to the light emitting module 310, the LED array 311 is driven using two different parts of the LED array 311 (step S120).

The control part 313 receives the feedback signal F_SIGNAL through the switch 314 (step S130). The feedback signal F_SIGNAL may be substantially the same as the output current of the LED array 311.

The control part 313 determines whether the feedback signal F_SIGNAL is greater than the upper limit value F+α or smaller than the lower limit value F−α (step S140).

When the feedback signal F_SIGNAL is smaller than or equal to the upper limit value F+α and the feedback signal F_SIGNAL is greater than or equal to the lower limit value F−α, a level of the control signal C_SIGNAL hat is applied to the control terminal of the switch 314 is maintained, and the control part 313 outputs the control signal C_SIGNAL to the control terminal of the switch 314 (step S150).

When the feedback signal F_SIGNAL is greater than the upper limit value F+α, the control part 313 decreases a level of the control signal C_SIGNAL that is applied to the control terminal of the switch 314, and the control part 313 outputs the control signal C_SIGNAL to the control terminal of the switch 314 (steps S160 and S170). Thus, the current flowing through the light emitting module 310 may be decreased.

When the feedback signal F_SIGNAL is smaller than the lower limit value F−α, the control part 313 increases a level of the control signal C_SIGNAL that is applied to the control terminal of the switch 314 and the control part 313 outputs the control signal C_SIGNAL to the control terminal of the switch 314 (steps S160 and S180). Thus, the current flowing through the light emitting module 310 may be increased.

According to the present exemplary embodiment, the switch connected to the control part is connected to the output terminal of the LED array so that the intensity of the current flowing through the light emitting parts may be adjusted by the switch.

The control part and the switch may include one or more active elements such as a transistor and a diode.

Thus, the display apparatus does not include a converter, so that a manufacturing cost may be decreased. In addition, the light emitting module includes the control part and the switch, so that the intensity of the current flowing through the light emitting parts may be adjusted. Accordingly, the light emitting parts may be driven stably, and may have long endurance.

Figure 5:
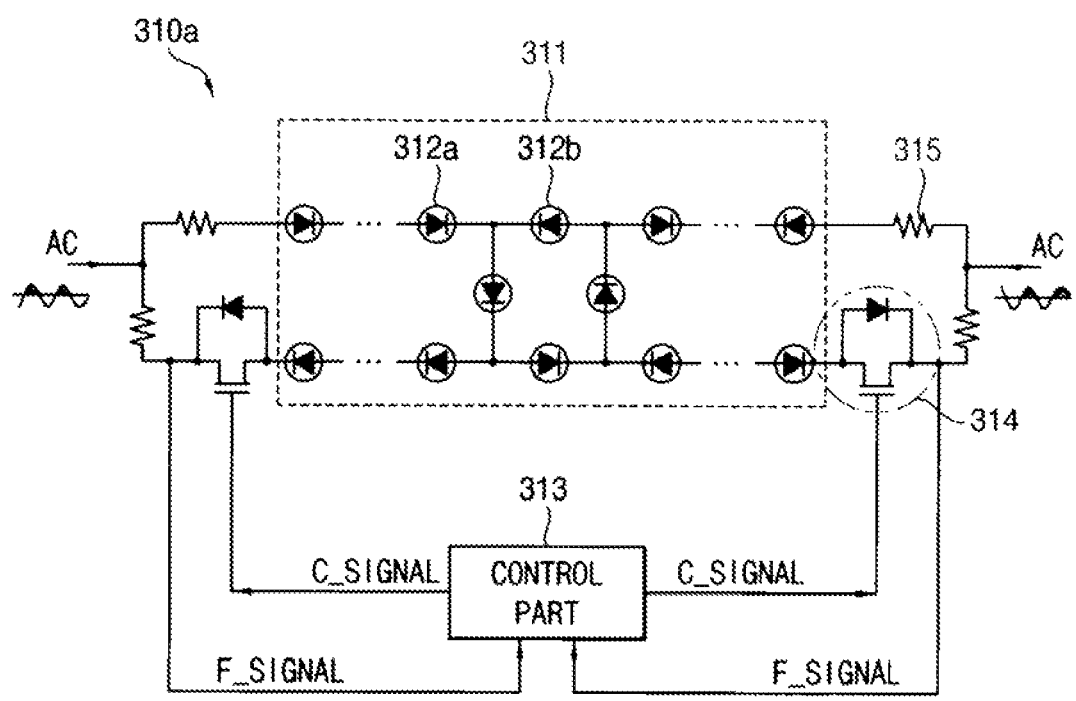
FIG. 5 is a circuit diagram illustrating a light emitting module according to another exemplary embodiment.

FIG. 5 is a circuit diagram illustrating a light emitting module 310a according to another exemplary embodiment.

The light emitting module 310a in FIG. 5 is substantially the same as the light emitting module 310 in FIG. 2 except that the light emitting module 310a further includes additional resistors. Thus, the same reference numerals will be used to refer to the same or like parts as those described in FIG. 1 to 3 and repetitive explanation concerning certain elements will be omitted.

Referring to FIG. 5, the light emitting module 310a includes an LED array 311, a control part 313, a plurality of switches 314 and a resistor 315. The light emitting module 310a is driven by the AC current received from outside the apparatus.

The LED array 311 includes first direction light emitting parts 312a, second direction light emitting parts 312b and bridge light emitting parts 312c. The light emitting parts 312 are disposed in a ladder shape through which current can flow in both directions so that the light emitting parts 312 form the LED array 311.

As described above with respect to FIGS. 2 and 5, the LED array 311 is divided into two parts according to the direction of the AC current applied to the LED array 311. The light emitting parts 312 may be disposed in two rows, and another light emitting part 312 connects two rows of the light emitting parts 312.

The control part 313 receives a feedback signal F_SIGNAL from the output terminal of the switch 314. The control part 313 determines whether the feedback signal F_SIGNAL is greater than an upper limit value F+α or smaller than a lower limit value F−α.

When the feedback signal F_SIGNAL is greater than the upper limit value F+α, the control part 313 decreases a level of the control signal C_SIGNAL that is applied to the control terminal of the switch 314, so that the current flowing through the light emitting module 310 may be decreased. When the feedback signal F_SIGNAL is smaller than the lower limit value F−α, the control part 313 increases a level of the control signal C_SIGNAL that is applied to the control terminal of the switch 314, so that the current flowing through the light emitting module 310 may be increased. When the feedback signal F_SIGNAL is smaller than or equal to the upper limit value F+α and the feedback signal F_SIGNAL is greater than or equal to the lower limit value F−α, a level of the control signal C_SIGNAL that is applied to the control terminal of the switch 314 is maintained.

The resistor 315 is connected to an input terminal of the LED array 311. The resistor 315 adjusts a level of the voltage applied to the LED array 311. Although the resistor 315 is connected to the input terminal of the LED array 311 in FIG. 5, the resistor 315 may alternatively be connected to the output terminal of the LED array 311.

According to the present exemplary embodiment, the light emitting parts are disposed in an array having a ladder-like shape. In addition, the switch connected to the control part is connected to the output terminal of the LED array. The control part and the switch may include one or more active elements, such as a transistor and a diode.

Thus, the light emitting parts may be driven by AC current without an AC-DC converter, so that the manufacturing cost may be decreased. In addition, the light emitting module includes the control part and the switch so that the intensity of the current flowing through the light emitting parts may be adjusted. Accordingly, the light emitting parts may be driven stably, and may have long endurance.

In addition, the light emitting module of FIG. 5 includes the resistor used to adjust the level of the voltage applied to the LED array, so that a driving voltage of the light emitting parts may be adjusted.

Figure 6:
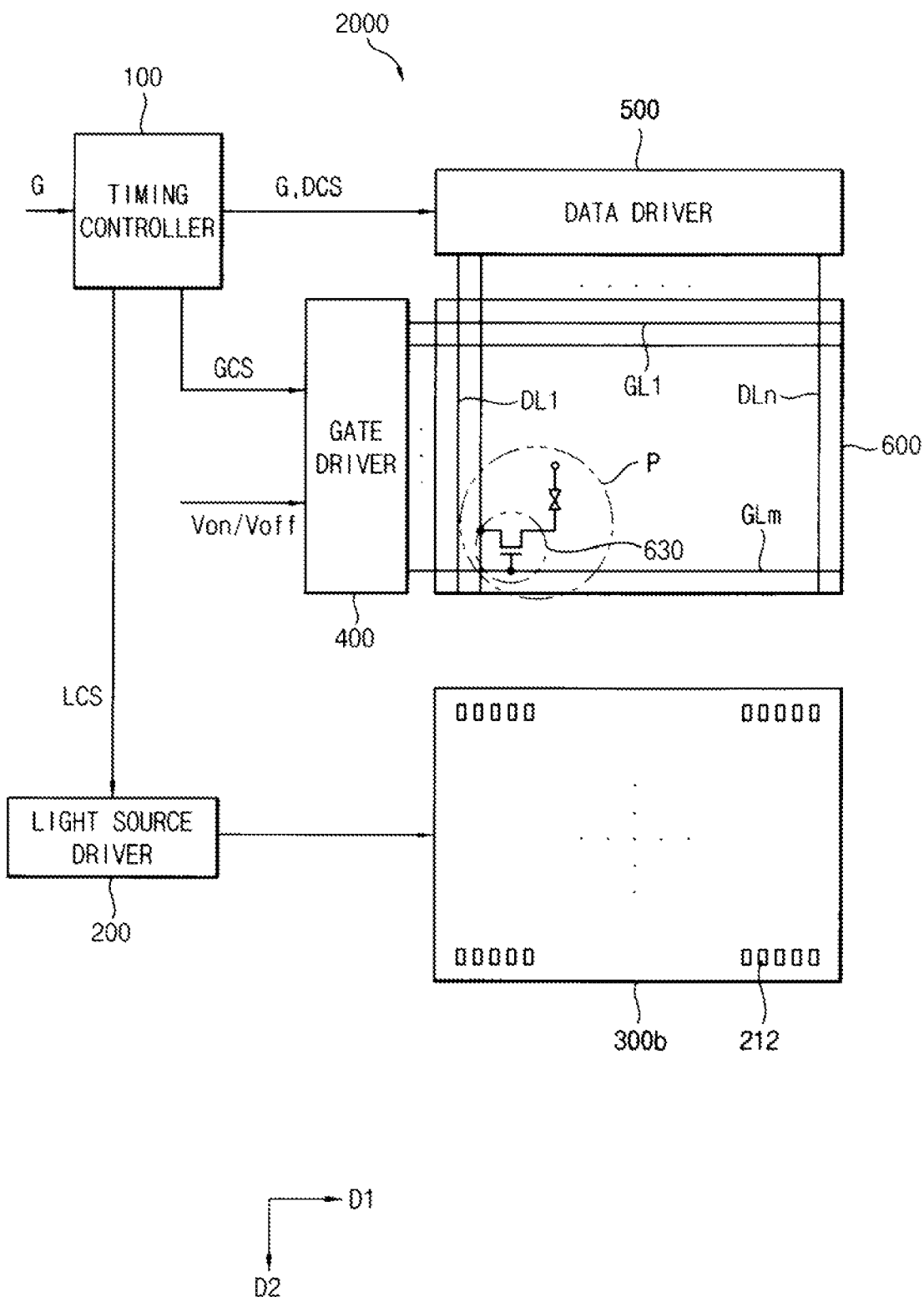
FIG. 6 is a block diagram illustrating a display apparatus according to still another exemplary embodiment.
Figure 7:
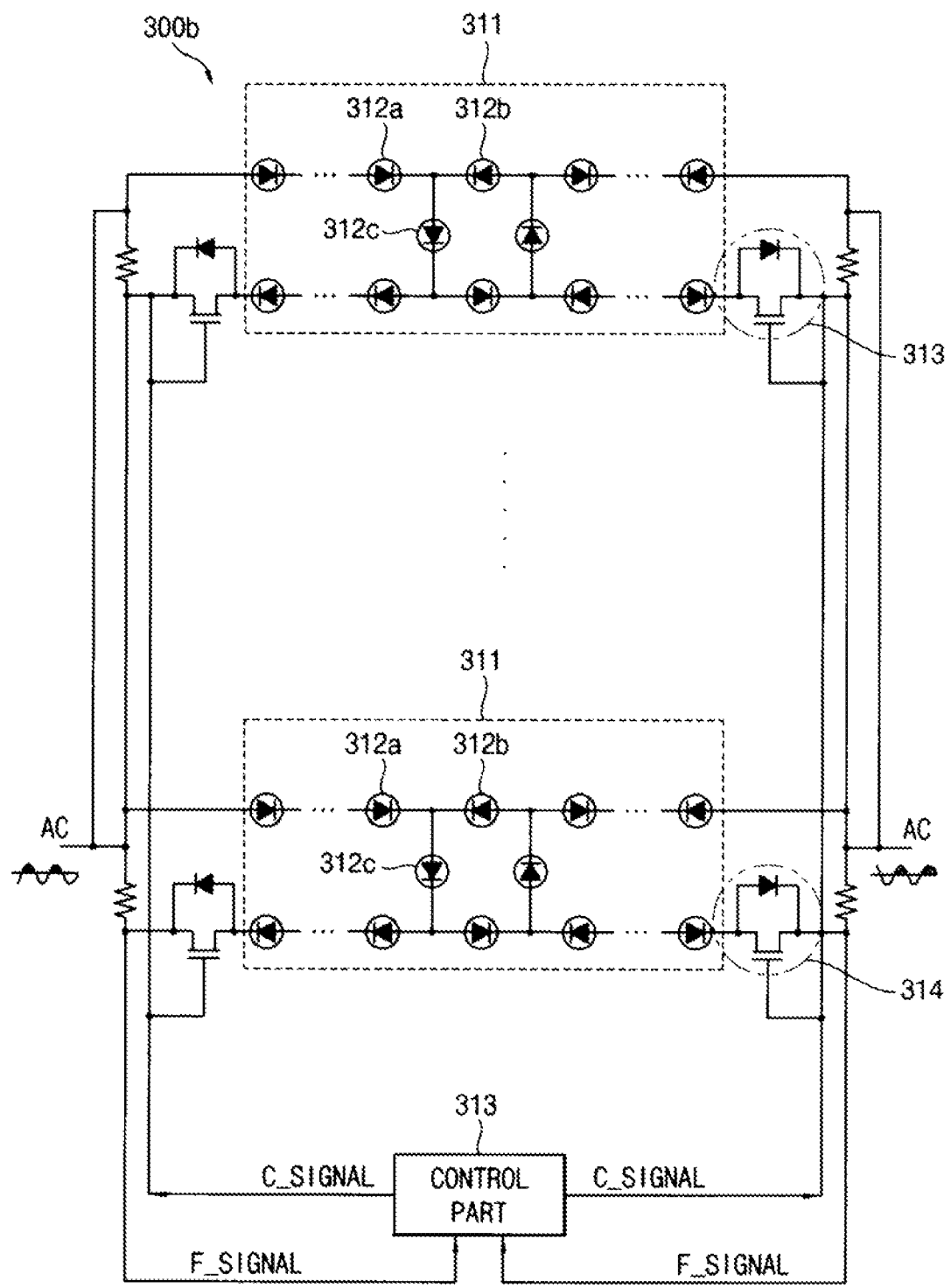
FIG. 7 is a circuit diagram illustrating a light source module of FIG. 6.

FIG. 6 is a block diagram illustrating a display apparatus 2000 according to another exemplary embodiment. FIG. 7 is a circuit diagram illustrating a light source module 300b of FIG. 6.

The display apparatus 2000 in FIG. 6 is substantially the same as the display apparatus 1000 in FIG. 1 except for the light source module. Thus, the same reference numerals will be used to refer to the same or like parts as those described in FIGS. 1 to 3 and repetitive explanation concerning certain elements will be omitted.

Referring to FIGS. 6 and 7, the display apparatus 2000 includes a timing controller 100, a light source driver 200, a gate driver 400, a data driver 500, a display panel 600 and a light source module 300b. The light source module 300b includes a plurality of LED arrays 311. The LED array 311 includes first direction light emitting parts 312a, second direction light emitting parts 312b and bridge light emitting parts 312c. The light emitting parts 312 are disposed in a ladder shape through which current can flow in both directions, so that the light emitting parts 312 form the LED array 311.

As shown in FIG. 7, the LED arrays 311 are connected with each other in parallel. The LED arrays 311 are disposed under the display panel 600 facing a rear surface of the display panel 600.

As described above with respect to FIGS. 2 and 5, the LED array 311 is divided into two parts according to the direction of the AC current applied to the LED array 311. The light emitting parts 312 may be disposed in two rows, and another light emitting part 312 connects two rows of the light emitting parts 312.

According to the present exemplary embodiment, the light emitting parts may be driven with AC current without an AC-DC converter, so that a manufacturing cost may be decreased. In addition, the light emitting module includes the control part and the switch so that the intensity of the current flowing through the light emitting parts may be adjusted. Accordingly, the light emitting parts may be driven stably, and may have long endurance.

In addition, the LED arrays are disposed under the display panel facing the rear surface of the display panel so that the display light source module provides light to the entire display panel uniformly, without a light guide plate.

Figure 8:
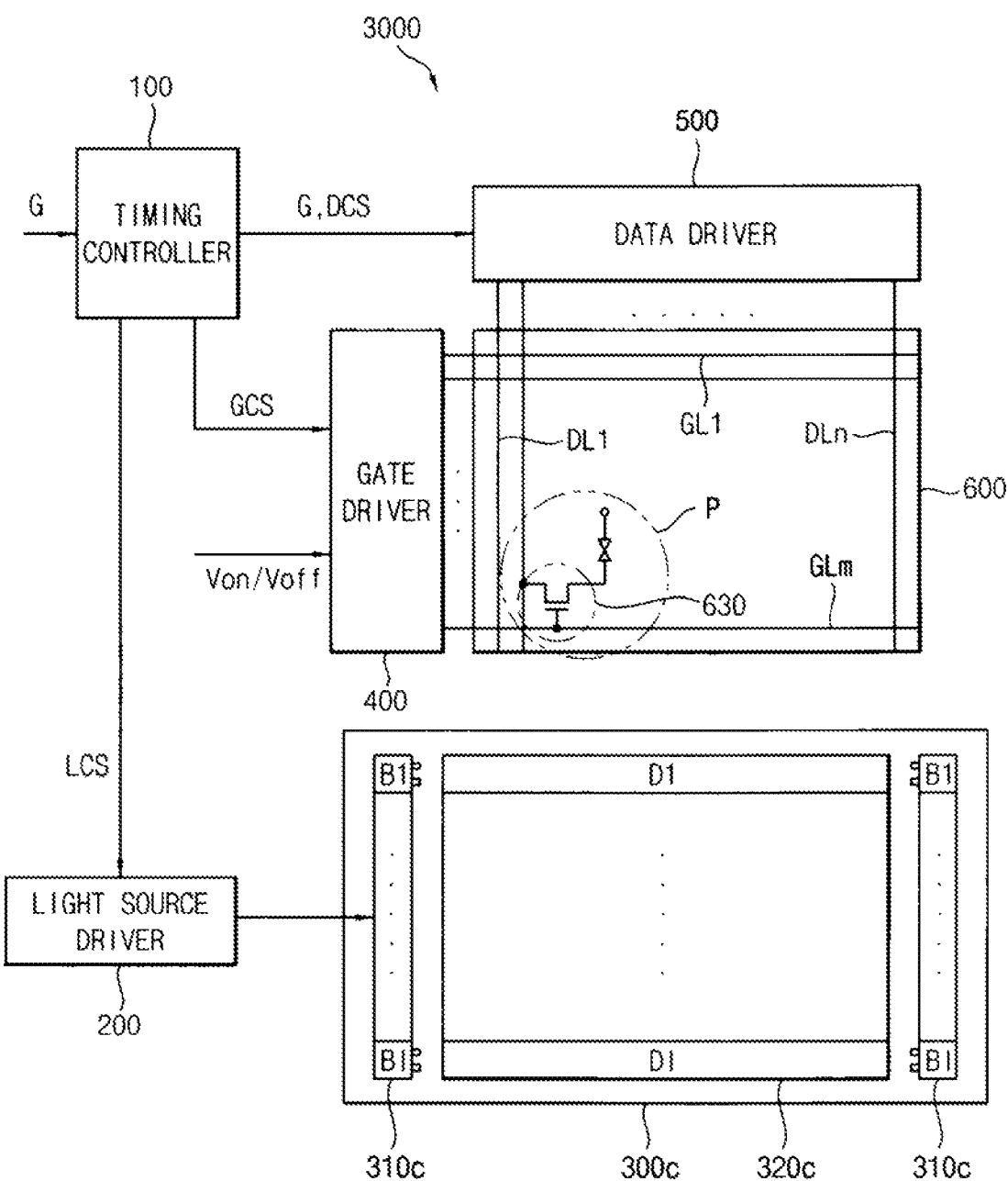
FIG. 8 is a block diagram illustrating a display apparatus according to still another exemplary embodiment.

FIG. 8 is a block diagram illustrating a display apparatus 3000 according to another exemplary embodiment.

The display apparatus 3000 in FIG. 8 is substantially the same as the display apparatus 1000 in FIG. 1 except for the light source module. Thus, the same reference numerals will be used to refer to the same or like parts as those described in FIGS. 1 to 3 and repetitive explanation concerning certain elements will be omitted.

Referring to FIG. 8, the display apparatus 3000 includes a timing controller 100, a light source driver 200, a gate driver 400, a data driver 500, a display panel 600 and a light source module 300c.

The light source driver 200 drives the light source module 300c using the light source control signal LCS provided from the timing controller 100. Based on the light source control signal LCS, the light source driver 200 independently controls a plurality of light emitting blocks B of the light source module 300c.

The light source module 300c provides light to the display panel 600. The light source module 300c includes light emitting modules 310c and a light guide plate 320c.

As shown in FIG. 8, the light emitting modules 310c may be disposed along the shorter sides of the light guide plate 320c (or, if only one light emitting module 310c is used, along one of the shorter sides). Alternatively, the light emitting module 310c may be disposed along one or both of the longer side of the light guide plate 320c.

The light emitting module 310c includes a plurality of light emitting blocks B. Luminances of the light emitting blocks B are independently controlled so that the light emitting blocks B may be driven in a local dimming driving method. As shown in FIG. 8, the light emitting module 310c has a one-dimensional local dimming structure including 1 through I number light emitting blocks B1 to BI disposed along the second direction D2. Herein, I is a natural number.

Each of the light emitting blocks B includes a plurality of LEDs, a control part and a plurality of switches. A circuit diagram of each of the light emitting blocks B is substantially same as that shown above in FIG. 2. A method of driving each of the light emitting blocks B is substantially same as that shown above in FIG. 4. Thus, any repetitive explanation concerning the above elements will be omitted.

According to the present exemplary embodiment, the light emitting module is divided into a plurality of light emitting blocks and the luminances of the lights are independently controlled according to the light emitting blocks, so that, for example, by using local dimming driving methods, the power consumption of the display apparatus may be reduced, and the contrast ratio of the display panel may be improved.

Figure 9:
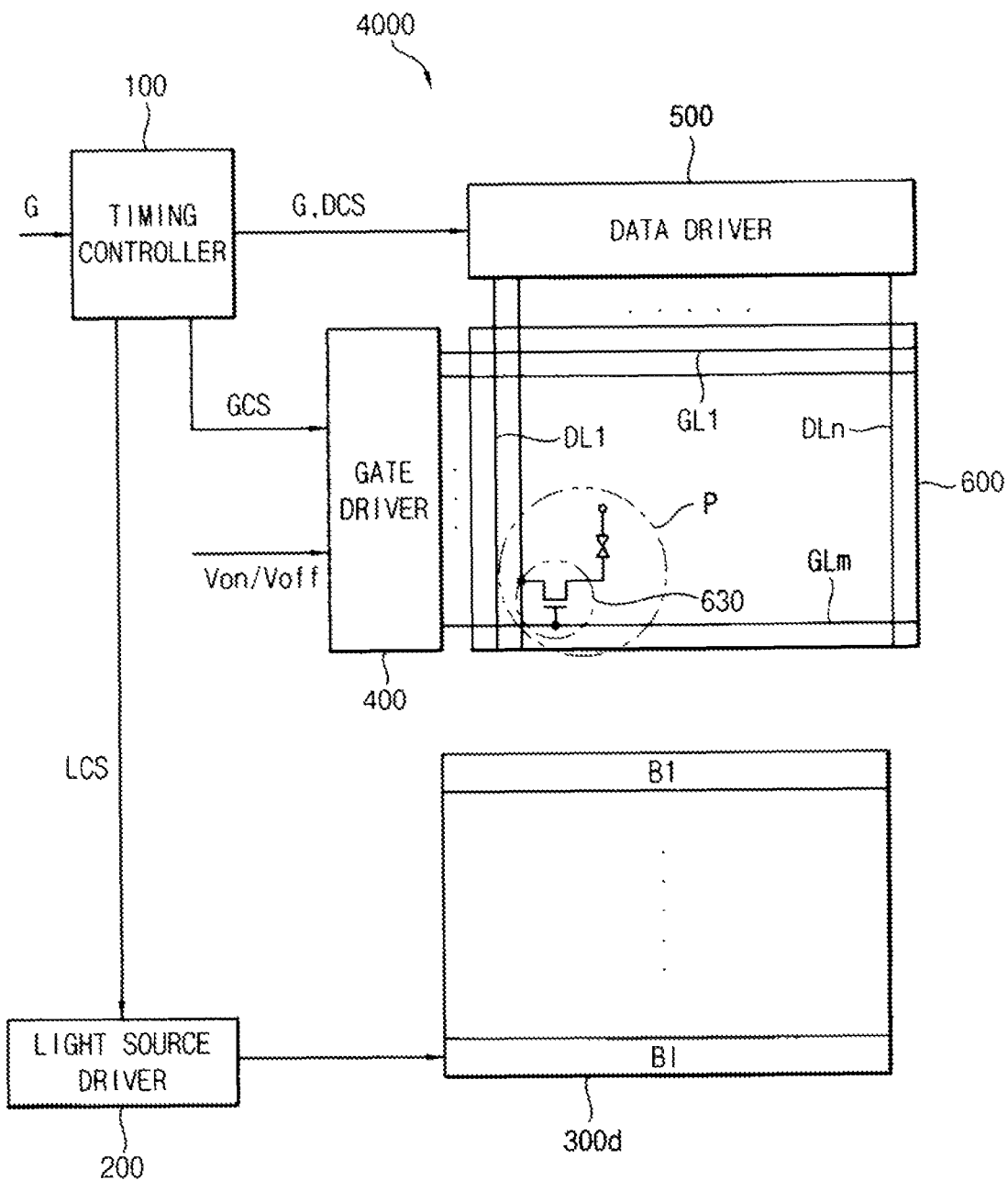
FIG. 9 is a block diagram illustrating a display apparatus according to still another exemplary embodiment.

FIG. 9 is a block diagram illustrating a display apparatus 4000 according to another exemplary embodiment.

The display apparatus 4000 in FIG. 9 is substantially the same as the display apparatus 1000 in FIG. 1 except for the light source module. Thus, the same reference numerals will be used to refer to the same or like parts as those described in FIGS. 1 to 3 and repetitive explanation concerning certain elements will be omitted.

Referring to FIG. 9, the display apparatus 3000 includes a timing controller 100, a light source driver 200, a gate driver 400, a data driver 500, a display panel 600 and a light source module 300d.

The light source module 300d provides a light to the display panel 600. As shown in FIG. 9, the light source module 300d is disposed under the display panel 600 and facing a rear surface of the display panel 600.

The light source module 300d includes a plurality of light emitting blocks B. Luminances of the light emitting blocks B are independently controlled so that the light emitting blocks B may be driven in a local dimming driving method. The light source module 300d has a one-dimensional local dimming structure including 1 to I number of light emitting blocks B1 to BI disposed along the second direction D2. Herein, I is a natural number.

Each of the light emitting blocks B includes a plurality of LEDs, a control part and a plurality of switches. A circuit diagram of each of the light emitting blocks B is substantially same as that shown in FIG. 2. A method of driving each of the light emitting blocks B is substantially same as that shown in FIG. 4. Thus, repetitive explanation concerning the above elements will be omitted.

According to the present exemplary embodiment, the light emitting module is divided into a plurality of light emitting blocks and the luminances of the lights are independently controlled according to the light emitting blocks so that, for example, using a local dimming driving method, the power consumption of the display apparatus may be reduced, and the contrast ratio of the display panel may be improved.

According to the present exemplary embodiment, the light emitting parts may be driven with AC current without an AC-DC converter, so that a manufacturing cost may be decreased. In addition, the light emitting module includes the control part and the switch so that the intensity of the current flowing through the light emitting parts may be adjusted. Accordingly, the light emitting parts may be driven stably, and may have long endurance.

According to the exemplary embodiments as explained above, the light emitting parts are disposed in a ladder-like shape through which current can flow in both directions, so that the AC current may be essentially rectified to drive the light emitting parts without an AC-DC converter. The switch connected to the control part is connected to the output terminal of the LED array so that the intensity of the current flowing through the light emitting parts may be adjusted by the switch. The control part and the switch may include one or more active elements such as a transistor and a diode.

Thus, the display apparatus does not include an AC-DC converter, so that manufacturing cost may be reduced. In addition, the light emitting module includes the control part and the switch so that the intensity of the current flowing through the light emitting parts may be adjusted. Accordingly, the light emitting parts may be driven stably, and may have long endurance.

The foregoing is illustrative and is not to be construed as limiting thereof. Although a few example embodiments have been described, those skilled in the art will readily appreciate that many modifications are possible in the example embodiments without materially departing from the novel teachings and advantages of the present disclosure. Accordingly, all such modifications are intended to be included within the scope of the present invention. In the claims, means-plus-function clauses are intended to cover the structures described herein as performing the recited function and not only structural equivalents but also equivalent structures. Therefore, it is to be understood that the foregoing is illustrative of and is not to be construed as limited to the specific example embodiments disclosed, and that modifications to the disclosed example embodiments, as well as other example embodiments, are intended to be included within the scope of the disclosure.

What is claimed is:

1. A light source module comprising:
a light emitting diode ("LED") array including a plurality of LED rows and a bridge light emitting part connecting the LED rows with each other, each of the LED rows having a first direction light emitting part and a second direction light emitting part which are alternately disposed with each other;
a switch configured to adjust a level of intensity of a current input into the LED array; and
a control part configured to determine an output status of the LED array and to provide a control signal to the switch, and
wherein an output terminal and a control terminal of the switch are connected to the control part, and an input terminal of the switch is connected to an output terminal of the LED array.

2. The light source module of claim 1, wherein an alternating-current ("AC") current is applied to the LED array.

3. The light source module of claim 1, wherein the switch comprises a thin film transistor.

4. The light source module of claim 1, wherein the control part maintains a level of the control signal when the output status of the LED array is in a predetermined range, and
the control part adjusts the level of the control signal when the output status of the LED array is out of the predetermined range.

5. The light source module of claim 1, further comprising a resistor connected to the LED array in series.

6. The light source module of claim 1, wherein the light source module comprises m LED arrays, and
m is a natural number equal to or greater than 2.

7. The light source module of claim 6, wherein the LED arrays are connected with each other in parallel.

8. The light source module of claim 6, wherein the light source module further comprises m control parts and m switches which are respectively connected to the m LED arrays, and
the LED arrays are independently driven.

9. The light source module of claim 8, further comprising a light guide plate,
wherein the LED arrays are disposed along at least one side of the light guide plate.

10. A method of driving a light source module, the method comprising:
driving an LED array including a plurality of LED rows and a bridge light emitting part connecting the LED rows with each other, each of the LED rows having a first direction light emitting part and a second direction light emitting part which are alternately disposed with each other;
adjusting an intensity of a current by a switch to be input into the LED array;
inputting the current having the adjusted intensity into the LED array; and
determining an output status of the LED array by a control part and outputting a control signal to the switch to control the output of the LED array;
wherein an output terminal and a control terminal of the switch are connected to the control part, and an input terminal of the switch is connected to an output terminal of the LED array.

11. The method of claim 10, wherein the LED array receives an AC current from outside the LED array.

12. The method of claim 10, wherein outputting the control signal comprises:
maintaining a level of the control signal when the output status of the LED array is in a predetermined range, and
adjusting the level of the control signal when the output status of the LED array is out of the predetermined range.

13. A display apparatus comprising:
a display panel including a plurality of pixels;
a light source module including:
an LED array including a plurality of LED rows and a bridge light emitting part connecting the LED rows with each other, each of the LED rows having a first direction light emitting part and a second direction light emitting part which are alternately disposed with each other;
a switch configured to adjust a level of intensity of a current input into the LED array; and
a control part configured to determine an output status of the LED array and to provide a control signal to the switch, and
wherein an output terminal and a control terminal of the switch are connected to the control part, and an input terminal of the switch is connected to an output terminal of the LED array.

14. The display apparatus of claim 13, wherein the control part maintains a level of the control signal when the output status of the LED array is in a predetermined range, and
the control part adjusts the level of the control signal when the output status of the LED array is out of the predetermined range.

15. The display apparatus of claim 13, wherein the light source module comprises m LED arrays connected with each other in parallel, and
m is a natural number equal to or greater than 2.

16. The display apparatus of claim 15, wherein the light source module further comprises m control parts and m switches which are respectively connected to the m LED arrays, and
the LED arrays are independently driven.

17. The display apparatus of claim 13, further comprising a light guide plate disposed under the display panel and facing a rear surface of the display panel.

18. The display apparatus of claim 17, wherein the LED arrays are disposed along at least one side of the light guide plate.

19. The display apparatus of claim 13, wherein the LED arrays are disposed under the display panel and facing a rear surface of the display panel.

* * * * *